United States Patent
Berthereau et al.

(10) Patent No.: US 7,811,954 B2
(45) Date of Patent: Oct. 12, 2010

(54) GLASS YARN FOR REINFORCING ORGANIC AND/OR INORGANIC MATERIALS

(75) Inventors: Anne Berthereau, Challes les Eaux (FR); Emmanuel Lecomte, Bobigny (FR); Sophie Creux, Den Haag (NL)

(73) Assignee: Saint-Gobain Technical fabrics Europe, Chambery (FR)

( * ) Notice: Subject to any disclaimer, the term of this patent is extended or adjusted under 35 U.S.C. 154(b) by 750 days.

(21) Appl. No.: 10/592,732

(22) PCT Filed: Mar. 14, 2005

(86) PCT No.: PCT/FR2005/050161

§ 371 (c)(1),
(2), (4) Date: Sep. 14, 2006

(87) PCT Pub. No.: WO2005/093227

PCT Pub. Date: Oct. 6, 2005

(65) Prior Publication Data

US 2008/0125304 A1    May 29, 2008

(30) Foreign Application Priority Data

Mar. 17, 2004    (FR) ................... 04 02742

(51) Int. Cl.
*C03C 13/06*    (2006.01)
*C03C 13/00*    (2006.01)
*C03C 3/091*    (2006.01)

(52) U.S. Cl. ............... 501/36; 501/35; 501/66; 501/67; 501/70

(58) Field of Classification Search .......... 501/35, 501/36, 66, 67, 70
See application file for complete search history.

(56) References Cited

U.S. PATENT DOCUMENTS

| | | | | |
|---|---|---|---|---|
| 4,911,972 A | * | 3/1990 | Mercuri | 428/99 |
| 5,290,522 A | * | 3/1994 | Rogers et al. | 422/179 |
| 5,962,354 A | * | 10/1999 | Fyles et al. | 501/36 |
| 6,136,735 A | | 10/2000 | Gallo et al. | |
| 6,458,436 B1 | * | 10/2002 | Hansen et al. | 428/34.5 |
| 6,686,304 B1 | * | 2/2004 | Wallenberger | 501/35 |
| 6,776,838 B2 | * | 8/2004 | Hemmings et al. | 106/716 |
| 6,818,575 B2 | * | 11/2004 | Wallenberger | 501/35 |
| 7,449,419 B2 | * | 11/2008 | Li | 501/36 |
| 2003/0224922 A1 | * | 12/2003 | Wallenberger | 501/35 |
| 2004/0175557 A1 | | 9/2004 | Creux et al. | |

FOREIGN PATENT DOCUMENTS

| | | |
|---|---|---|
| WO | 99 01393 | 1/1999 |
| WO | 99 12858 | 3/1999 |
| WO | 00 73231 | 12/2000 |
| WO | 00 73232 | 12/2000 |
| WO | 01 32576 | 5/2001 |
| WO | 02 20419 | 3/2002 |
| WO | 02 42233 | 5/2002 |

OTHER PUBLICATIONS

U.S. Appl. No. 11/722,039, filed Jun. 18, 2007, Lecomte, et al.
U.S. Appl. No. 10/592,945, filed Sep. 15, 2006, Creux, et al.
U.S. Appl. No. 10/560,068, filed Dec. 9, 2005, Lecomte, et al.
U.S. Appl. No. 10/548,581, filed Jun. 27, 2006, Creux, et al.
U.S. Appl. No. 10/129,265, filed Sep. 30, 2002, Creux, et al.
U.S. Appl. No. 12/663,087, filed Dec. 4, 2009, Berthereau, et al.

* cited by examiner

*Primary Examiner*—Karl E Group
*Assistant Examiner*—Elizabeth A Bolden
(74) *Attorney, Agent, or Firm*—Oblon, Spivak, McClelland, Maier & Neustadt, L.L.P.

(57) ABSTRACT

The invention relates to glass reinforcement strands, the composition of which comprises the following constituents in the limits defined below, expressed as percentages by weight: 59 to 63% $SiO_2$; 10 to 16% $Al_2O_3$; 16 to 23% CaO; 1 to 3.2% MgO; 0 to 2% $Na_2O+K_2O+Li_2O$; 0 to 1% $TiO_2$; 0.1 to 1.8% $B_2O_3$; 0 to 0.5% $Li_2O$; 0 to 0.4% ZnO; 0 to 1% MnO; and 0 to 0.5% F. These strands have improved properties in terms of mechanical strength, acid resistance and high-temperature resistance for a low-cost composition. The invention also relates to a process for producing the said strands and to the composition allowing them to be produced.

9 Claims, No Drawings

GLASS YARN FOR REINFORCING ORGANIC AND/OR INORGANIC MATERIALS

The present invention relates to glass strands or fibres, especially those intended for reinforcing organic and/or inorganic materials and able to be used as textile strands, these strands being able to be produced by a process consisting in mechanically attenuating streams of molten glass emanating from orifices placed at the base of a bushing, generally heated by resistance heating.

The invention relates more particularly to glass strands having a particularly advantageous novel composition.

The field of glass reinforcement strands is one particular field of the glass industry. These strands are produced from specific glass compositions, the glass used having to be able to be attenuated into the form of filaments a few microns in diameter, using the process described above, and having to allow the formation of strands capable in particular of fulfilling their reinforcement role. The glass reinforcement strands most commonly used are thus strands formed from glasses whose composition derives from the eutectic composition of the $SiO_2$—$Al_2O_3$—$CaO$ ternary diagram, the liquidus temperature of which is 1170° C. These strands are referred to by the name of "E-glass" strands, the archetype of which is described in the patent publications U.S. Pat. No. 2,334,981 and U.S. Pat. No. 2,571,074, which strands have a composition essentially based on silica, alumina, lime and boric anhydride. The latter compound, present with contents ranging in practice from 5 to 13% in glass compositions for "E-glass", is added as a replacement for silica so as to reduce the liquidus temperature of the glass formed and to make it easier for the glass to melt. The term "liquidus temperature", denoted by $T_{liq}$, is the temperature at which, in a system in thermodynamic equilibrium, the most refractory crystal appears. The liquidus temperature therefore gives the lower limit at which it is possible to fiberize the glass.

E-glass strands are furthermore characterized by a limited content of alkali metal oxides (essentially $Na_2O$ and/or $K_2O$).

Since the two abovementioned patent applications, glasses comprising these constituents have undergone numerous modifications with the purpose of reducing emanations of products liable to pollute the atmosphere, of reducing the cost of the composition by decreasing the content of the most expensive constituents, of improving the capability of these glasses to undergo fiberizing (fiberizing or forming corresponding to the operation of attenuating the glass filaments coming from a bushing using the process described above), especially by reducing their viscosity at high temperatures and their tendency to devitrify, or finally of improving one particular property intended to increase their performance (or to make them suitable) for certain applications.

Solutions for greatly reducing polluting emanations have consisted in eliminating the most volatile elements from the compositions, these being boric anhydride and fluorine. Decreasing the boric anhydride content is also a means of reducing the cost of the compositions. The elimination of boric anhydride and fluorine in the compositions of these glasses is generally to the detriment of their fiberizability and their processing in order to obtain reinforcement strands, which generally becomes more difficult or tricky, possibly requiring modifications to existing fiberizing installations.

The publication U.S. Pat. No. 3,847,626 describes and claims compositions in which these elements have been replaced with high contents of titanium oxide, ranging from 3 to 5%, and with magnesia, contents ranging from 1.5 to 4%. These two oxides make it possible to compensate for the absence of boron and fluorine, making the glasses formed from these compositions suitable for fiberizing. However, the yellow coloration conferred by such levels of titanium tends to exclude this type of composition for certain applications. High titanium oxide contents, ranging from 2 to 4%, are also recommended in Publication U.S. Pat. No. 4,026,715, this constituent generally being added together with divalent oxides such as SrO, ZnO or BaO, which furthermore have the disadvantage of being expensive.

Publication U.S. Pat. No. 4,199,364 describes compositions having high lithium oxide contents. Apart from its high cost, lithium oxide forms part of the alkali metal oxides, which are known to degrade the capability of the fibres to reinforce electronic circuit substrates.

Application WO 96/39362 describes compositions containing neither boron nor fluorine, which are essentially formed from the $SiO_2$—$Al_2O_3$—$CaO$—$MgO$ quaternary system, containing small amounts of titanium oxide (less than 0.9%) and generally containing no additions of expensive oxides such as those described in the aforementioned applications. However, these glasses have a liquidus temperature and a forming temperature that are relatively high.

In the field of glass strands obtained by mechanical attenuation of molten glass streams, the term "forming temperature" is the temperature for which the glass possesses a viscosity of 1000 poise (decipascals.second), around which viscosity the glass must be fiberized. This temperature, denoted $T_{log\,3}$, corresponds more particularly to the temperature of the glass at the bushing nipples. The temperature of the glass on entering the bushing corresponds to a viscosity of the order of $10^{2.5}$ poise, and is denoted by $T_{log2.5}$.

To avoid any risk of devitrification during forming, the "fiberizing range", denoted by $\Delta T$ and defined as the difference between the forming temperature and the liquidus temperature, must be positive and preferably greater than 50° C.

High values of these various temperatures require the glass to be maintained at high temperatures both during the conditioning of the glass and in the fiberizing device itself.

This drawback results in an additional cost due to the additional supply of heat needed to condition the glass and to more frequent renewal of the fiberizing tools, especially the parts made of platinum, the ageing of which is greatly accelerated by the increase in temperature.

More recently, several applications have also disclosed compositions for obtaining low-cost glasses, which possess liquidus and forming temperatures close to those of E-glass, therefore allowing them to be fiberized more easily.

Thus, Patent Publications WO 99/12858 and WO 99/01393 describe glass compositions containing small amounts of fluorine or boron oxide. In WO 00/73232, the lowering of the characteriztic temperatures is achieved by compositions having a low MgO content (less than 1%) and by the addition of a certain amount of boron oxide or lithium oxide or zinc oxide or even manganese oxide, thereby lessening the economic advantage of these compositions. WO 00/73231 discloses compositions whose liquidus temperature is lowered, especially thanks to the addition of MgO within a narrow range of contents, between 1.7 and 2.6%. Most of the compositions exemplified in the above application furthermore include an oxide chosen from boron oxide, lithium oxide, zinc oxide or even manganese oxide. The reduction in characteriztic temperatures of the process can also be achieved, in WO 01/32576, by the low silica contents (less than 58%) of the compositions, and in WO 02/20419, by selecting compositions whose silica content/alkaline-earth metal content ratio is less than 2.35.

The objectives pursued by the various inventions mentioned were mainly to reduce the cost of the compositions and to reduce the amount of environmentally harmful materials discharged. The use of fibres for certain applications has also dictated the choice of very specific compositions. Thus, three properties may be particularly sought after: acid resistance, resistance at high temperatures and high mechanical strength, especially tensile strength, of the fibres. The first property is particularly desired in applications of reinforcing organic and/or inorganic materials which come into contact with an acid medium, for example in the chemical industry. The second property is of paramount importance when the glass strands are used for example in exhaust systems for motor vehicles. The third property is sought when the materials reinforced by the glass strands are subjected to high mechanical stresses.

For each of these properties, particular compositions have been developed.

Publications WO 03/050049 and WO 02/42233 describe glass fibres such that their composition makes them suitable for being employed in motor vehicle exhaust systems. In the first application, the objective is achieved thanks to a glass composition containing very small amounts (less than 1%) of MgO. These glasses also contain high contents (at least 1.5%) of titanium oxide. The second application describes glass compositions containing a particular range of alkaline-earth metal oxide contents. Many examples in this application are glasses that contain barium oxide or strontium oxide. Document FR-A-2 804 107 describes fibres having a particular composition, the high-temperature resistance property of which stems from a treatment of their surface for the purpose of obtaining an extremely silica-enriched surface composition.

Application FR-A-2 692 248 describes and claims glass compositions which behave, during melting and during fiberizing, in a manner similar to E-glass, but which possess a markedly superior acid resistance, especially thanks to the reduction in boric anhydride and alumina contents. Nevertheless, the glasses claimed do possess a boric anhydride content of even greater than 2%.

The above examples show that specific compositions have been developed in order to meet certain technical, economic or environmental constraints but that the optimization of a single range of compositions, allowing all of these constraints to be met, which from the industrial standpoint is highly desirable, remains to be accomplished.

One object of the present invention is therefore to propose glass compositions of advantageously low cost which exhibit good formability and make it possible to obtain glass strands having high-temperature resistance, acid resistance and mechanical strength properties that are significantly improved over those of E-glass and/or are similar to certain currently available glasses while exhibiting better formability.

Another object of the invention is to propose glass compositions which, when they are being melted, give off little emanation liable to damage the environment.

These objects are achieved thanks to glass strands whose composition comprises the following constituents in the limits defined below, expressed as percentages by weight:

| | |
|---|---|
| $SiO_2$ | 59 to 63 |
| $Al_2O_3$ | 10 to 16 |
| CaO | 16 to 23 |
| MgO | 1 to less than 3.2 |
| $Na_2O + K_2O + Li_2O$ | 0 to 2 |
| $TiO_2$ | 0 to 1 |

-continued

| | |
|---|---|
| $B_2O_3$ | 0.1 to 1.8 |
| $Li_2O$ | 0 to 0.5 |
| ZnO | 0 to 1 |
| MnO | 0 to 1 |
| F | 0 to 0.5. |

Silica is an oxide acting as a glass network former, and plays an essential role in stabilizing the glass. Within the limits defined above, when the percentage of this constituent is less than 58%, the glass obtained is not viscous enough and it devitrifies too easily during fiberizing. For contents above 63%, the glass becomes very viscous and difficult to melt. Consequently, the silica content is preferably less than 62.5% and particularly preferably less than 62%. Since silica plays an essential beneficial role in acid corrosion resistance, its content is preferably greater than 60%, especially 60.5% or greater, and even 61%. A particularly preferred compromise consists in choosing a silica content of between 60 and 61%.

Alumina also constitutes a network former in the glasses according to the invention and plays a fundamental role in their stability. Within the limits defined according to the invention, a content of less than 10% causes a substantial increase in the hydrolytic attack of the glass, whereas increasing the content of this oxide to above 16% runs the risk of devitrification and an increase in the viscosity. Owning to its deleterious effect on the acid corrosion properties, the alumina content is preferably maintained below 15% or even 14%. The greatest resistance to devitrification is obtained for alumina contents of between 11 and 14%, preferably between 12 and 13%.

Lime and magnesia make it possible to adjust the viscosity and control the devitrification of the glasses according to the invention. Within the limits defined according to the invention, a CaO content of 23% or higher results in an increase in the rates of devitrification to $CaSiO_3$ (wollastonite) prejudicial to good fiberizing. The CaO content must therefore be maintained at a value strictly less than 23%. A CaO content of less than 16% results in too low a hydrolytic resistance. The CaO content is therefore preferably greater than 18%, and even greater than 20%. The MgO content, together with the lime content, makes it possible to obtain glasses of which the liquidus temperature is particularly low. This is because the addition of magnesia in defined contents makes it possible to introduce a competition between the growth of wollastonite and diopside ($CaMgSi_2O_6$) crystals, this having the effect of reducing the rate of growth of these two crystals, and therefore of giving good devitrification resistance. The MgO content is greater than 1%. The MgO content is also preferably maintained at 3% or lower, but greater than 2%, and especially 2.2% or higher, or indeed 2.6. For contents of 3.2% or higher, the rate of crystallization of diopside is too great. For this reason, the MgO content of the glasses according to the invention is strictly less than 3.2%.

The alkali metal oxides may be introduced into the compositions of the glass strands according to the invention in order to limit devitrification and reduce the viscosity of the glass. However, the alkali metal oxide content must be less than 2% in order to avoid an unacceptable increase in the electrical conductivity for applications in the electronics field and to avoid a detrimental reduction in the hydrolytic resistance of the glass. The lithium content must especially be maintained below 0.5% and preferably below 0.1%. The inventors have demonstrated the extremely deleterious role of alkali metal oxides in the high-temperature resistance, especially characterized by their softening temperature. This role is known in general, but within this particular context the effect on the reduction in characteristic temperatures at which the glass softens, due to very low alkali metal oxide contents has turned out to be astonishingly great. The total content of alkali metal oxides therefore preferably does not exceed 1.5%, or even 1%.

$TiO_2$ plays an important role in the glasses according to the invention. This oxide is known as a flow promoter for the glass and is capable of reducing the liquidus temperature, and thereby partially replacing boron oxide. Beyond 1%, the yellow coloration and the additional cost that it generates may become unacceptable for certain applications. The ultraviolet absorption due to the high titanium contents may also be unacceptable when the fibres are intended for reinforcing polymers that are crosslinked by means of UV radiation. For these various reasons, the titanium oxide content of the glasses according to the invention is less than 1% and preferably is equal to 0.9% or lower, and even 0.8%. To benefit from the advantages afforded by the presence of titanium oxide, its content is preferably 0.5% or higher.

Boric anhydride $B_2O_3$ is added to the composition of the glasses according to the invention, in a content greater than 0.1%, so as to facilitate the melting and forming of the glasses. Boron may in fact be introduced in a moderate amount, and inexpensively, by the incorporation, as batch material, of glass strand waste containing boron, for example E-glass strand waste. Another inexpensive means of introducing small amounts of boron consists in using natural batch materials providing boron oxide and alkali metal oxides, such as, for example, borax (chemical formula $Na_2B_4O_7.5H_2O$). Since such batch materials provide sodium, and, owing to the limitation of the total alkali metal oxide content which is desired, the boron oxide content of the glasses according to the invention is strictly less than 1.8%. However, the inventors have demonstrated its deleterious role on the acid corrosion resistance properties and the high-temperature resistance properties. The $B_2O_3$ content is thus preferably less than 1.5%, and even more preferably less than 1.1%. However, it has been discovered that low boron oxide contents, which are particularly beneficial for the melting and forming of the glasses according to the invention, do not degrade the above-mentioned properties very appreciably. A minimum content of 0.5% of boron oxide is therefore preferred in the glasses according to the invention. When the $B_2O_3$ content is greater than or equal to 0.5% and the $TiO_2$ content is less than 0.5%, it is desirable for the $SiO_2$ content to be greater than 60.5% so as to retain the good acid corrosion resistance properties.

Zinc oxide (ZnO) is used to reduce the viscosity of the glasses according to the invention and to increase their acid corrosion resistance. However, owing to the high cost of this oxide, its content is less than 0.4%, preferably less than 0.1%.

The manganese oxide content is less than 1% and preferably less than 0.3%. Since this oxide is liable to give the glass a very intensive violet coloration, the MnO content is preferably maintained below 0.1%.

Fluorine may be added in a small amount in order to improve the melting of the glass, or it may be present as an impurity. However, it has been discovered that small amounts of fluorine affect the temperature resistance of the glasses according to the invention very markedly. The fluorine content is therefore advantageously maintained below 0.5% and especially below 0.1%.

Iron oxide is an unavoidable impurity in the glasses according to the invention owing to its presence in several batch materials, and its content is generally less than 0.5%. Given that the coloration effect generally attributed to titanium is in fact due to electron transfer between $Fe^{2+}$ and $Ti^{4+}$ ions, the iron content in the glasses according to the invention is advantageously less than 0.3%, especially less than 0.2%, thanks to a judicious choice of batch materials.

One or more other components (differing from those already considered, i.e. different from $SiO_2$, $Al_2O_3$, CaO, MgO, $Na_2O$, $K_2O$, $Li_2O$, $B_2O_3$, $TiO_2$, F, $Fe_2O_3$, ZnO, MnO) may also be present, generally as impurities, in the composition according to the invention, the total content of these other components remaining less than 1%, preferably less than 0.5%, the content of each of these other components generally not exceeding 0.5%.

The glass strands according to the invention may be produced and employed like E-glass strands. They are also less expensive and exhibit better temperature resistance, acid corrosion resistance and tensile strength.

The glass strands according to the invention are obtained from glasses with the composition described above using the following process: a multiplicity of molten glass streams emanating from a multiplicity of orifices dispersed over the base of one or more bushings are attenuated into the form of one or more webs of continuous filaments, and then assembled into one or more strands that are collected on a moving support. This may be a rotating support when the strands are collected in the form of bound packages, or a support that moves translationally, when the strands are chopped by a member that also serves to attenuate them, or when the strands are sprayed by a member serving to attenuate them in order to form a mat.

The strands obtained, optionally after other conversion operations, may thus be in various forms, namely continuous strands, chopped strands, braids, tapes, mats, networks, etc., these strands being composed of filaments with a diameter possibly ranging from 5 to 30 microns, approximately.

The molten glass feeding the bushings is obtained from batch materials that may be pure (for example coming from the chemical industry) but are often natural, these batch materials sometimes containing impurities in trace amount and being mixed in appropriate proportions in order to obtain the desired composition, and then melted. The temperature of the molten glass (and therefore its viscosity) is conventionally set by the operator so as to allow the glass to be fiberized, while in particular avoiding problems of devitrification, and so as to obtain the best possible quality of the glass strands. Before they are assembled in the form of strands, the filaments are generally coated with a sizing composition for protecting them from abrasion and facilitating their subsequent association with materials to be reinforced.

The composites obtained from the strands according to the invention comprise at least one organic material and/or at least one inorganic material and glass strands, at least some of the strands being glass strands according to the invention.

Optionally, the glass strands according to the invention may have already been associated, for example during attenuation, with filaments of organic material so as to obtain composite strands. By extension, the expression "glass strands whose composition comprises . . . " is understood to mean, according to the invention, "strands formed from filaments of glass whose composition comprises . . . ", the glass filaments being optionally combined with organic filaments before the filaments are assembled as strands.

Owing to their good high-temperature resistance properties, the glass strands according to the invention may also be used for furnishing motor vehicle exhaust systems. In this particular application, the glass strands according to the invention give good acoustic insulation properties, but they are also exposed to temperatures that may exceed 850° C. or even 900° C.

The advantages afforded by the glass strands according to the invention will be more fully appreciated through the following examples, which illustrate the present invention without however limiting it.

Table 1 gives five examples according to the invention, numbered 1 to 5, and three comparative examples, numbered C1 to C3. C1 is a standard E-glass composition and C2 is a composition deriving from Patent Application WO 99/12858, while C3 is according to the teaching of Application WO 96/39362.

The composition of the glasses is expressed as percentages of oxides by weight.

To illustrate the advantages of the glass compositions according to the invention, Table 1 presents four fundamental properties:

the temperature corresponding to a viscosity of $10^{2.5}$ poise, denoted by $T_{log\ 2.5}$ and expressed in degrees Celsius, close to the temperature of the glass in the bushing;

the difference between the latter temperature and the liquidus temperature (termed $T_{liq}$), which represents a forming margin that has to be as high as possible;

the softening temperature or Littleton softening point, corresponding to a viscosity of $10^{7.6}$ poise, denoted by $T_{log\ 7.6}$ and expressed in degrees Celsius, this value being indicative of the temperature resistance of the fibres, these two temperature values and their respective method of measurement being well known to those skilled in the art; and the value of the failure stress in three-point bending of composites based on vinyl ester resin (sold by Dow Chemical Company under the name Derakane 411-350) comprising a fibre volume fraction of 50% after immersion in a hydrochloric acid solution (HCl of 1N concentration) at room temperature for 100 hours. This stress is expressed in MPa and characterizes the resistance of the fibres to acid corrosion.

forming margin is appreciably more comfortable (at least 25° C. higher) and even approaches conditions for E-glass, thanks to the moderate addition of boric anhydride. The fibres according to the invention are in all points superior to the fibres of Comparative Example C2.

Examples 1, 2 and 3 illustrate the influence of certain oxides on the acid corrosion resistance of the fibres. Example 2 for example illustrates, by comparison with Example 1, the beneficial role of $SiO_2$ and the prejudicial role of $Al_2O_3$, whereas Example 3 shows, compared with Example 2, the deleterious influence of boron oxide.

Examples 4 and 5 contain titanium oxide $TiO_2$. Comparing Examples 4 and 2, it is possible to demonstrate the beneficial role of this oxide on the temperature resistance, but also on the acid corrosion resistance, since the latter is improved despite the higher $Al_2O_3$ content and the lower $SiO_2$ content in Example 4.

The temperature and acid corrosion resistance properties and the fiberizing properties of the glasses according to the invention are therefore particularly well optimized.

What is claimed is:

1. A glass strand, comprising the following constituents in the limits defined below, expressed as percentages by weight:

| | |
|---|---|
| $SiO_2$ | 59 to 63 |
| $Al_2O_3$ | 10 to 16 |
| CaO | 16 to 23 |
| MgO | 1 to less than 3.2 |
| $Na_2O + K_2O$ | 0 to 2 |
| $TiO_2$ | 0 to 1 |
| $B_2O_3$ | 0.5 to 1.5 |
| $Li_2O$ | 0 to 0.5 |
| ZnO | 0 to 0.5 |
| MnO | 0 to 1 | and which does not comprise F or Li.

TABLE 1

| | C1 | C2 | C3 | 1 | 2 | 3 | 4 | 5 |
|---|---|---|---|---|---|---|---|---|
| $SiO_2$ | 54.4 | 59.7 | 60.1 | 60.1 | 60.9 | 60.9 | 60.2 | 60.2 |
| $Al_2O_3$ | 14.5 | 13.2 | 12.8 | 13.0 | 12.2 | 12.2 | 12.5 | 12.7 |
| CaO | 22.1 | 22.2 | 23.1 | 22.0 | 22.2 | 21.9 | 22.0 | 22.0 |
| $B_2O_3$ | 7.3 | — | — | 0.7 | 1.0 | 1.5 | 1.0 | 0.5 |
| $Na_2O$ | 0.5 | 0.9 | 0.3 | 0.4 | 0.4 | 0.4 | 0.4 | 0.4 |
| MgO | 0.25 | 2.4 | 3.3 | 3.1 | 2.6 | 2.4 | 2.4 | 3.0 |
| $TiO_2$ | 0.1 | — | — | — | — | — | 0.8 | 0.5 |
| $K_2O$ | 0.35 | 0.4 | 0.2 | 0.4 | 0.4 | 0.4 | 0.4 | 0.4 |
| F | — | 0.9 | — | — | — | — | — | — |
| $T_{log2.5}$ (° C.) | 1285 | 1341 | 1350 | 1356 | 1359 | 1360 | 1358 | 1357 |
| $T_{log2.5} - T_{liq}$ (° C.) | 205 | 161 | 150 | 185 | 175 | 185 | 195 | 175 |
| $T_{log7.6}$ (° C.) | 836 | 881 | 920 | 916 | 920 | 918 | 923 | 923 |
| Failure stress (MPa) | 200 | 420 | 550 | 500 | 545 | 540 | 550 | 540 |

As indicated in Table 1, the fibres according to the invention are very substantially superior to the E-glass fibres (Comparative Example C1) in terms of temperature resistance (the difference of about 100° C.) and of acid corrosion resistance (an at least two to three times higher failure stress).

The fibres according to the invention have usage properties that are quite similar to those of Example C3, but have the advantage of having improved fiberizing conditions, since the 2. The glass strand according to claim 1, formed from a glass melt obtained by melting a batch characterized in that the said batch includes borax.

3. The glass strand according to claim 1, characterized in that the $TiO_2$ content is greater than or equal to 0.5%.

4. The glass strand according to claim 1, wherein when the $TiO_2$ content is less than or equal to 0.5%, the $SiO_2$ content is greater than 60.5%.

5. The glass strand according to claim 1, wherein the MgO content is greater than or equal to 2.2%.

6. A composite, comprising glass strands, organic material, inorganic material and the glass strand as defined in claim 1.

7. A fitting for an exhaust system, the glass strand as defined in claim 1.

8. A glass composition suitable for producing glass reinforcement fibres, which comprises the following constituents in the limits defined below, expressed as percentages by weight:

| | |
|---|---|
| $SiO_2$ | 59 to 63 |
| $Al_2O_3$ | 10 to 16 |
| CaO | 16 to 23 |
| MgO | 1 to less than 3.2 |
| $Na_2O + K_2O$ | 0 to 2 |
| $TiO_2$ | 0 to 1 |
| $B_2O_3$ | 0.5 to 1.5 |
| ZnO | 0 to 0.5 |
| MnO | 0 to 1 | and which does not comprise F or Li.

9. A process for manufacturing glass strands, comprising attenuation into the form of one or more webs of continuous filaments from a multiplicity of molten glass streams emanating from a multiplicity of orifices placed at the base of one or more bushings, and of assembling the said filaments into one or more strands that are collected on a moving support, the molten glass feeding the bushings having a composition according to claim 8.

* * * * *

UNITED STATES PATENT AND TRADEMARK OFFICE
CERTIFICATE OF CORRECTION

PATENT NO. : 7,811,954 B2  Page 1 of 1
APPLICATION NO. : 10/592732
DATED : October 12, 2010
INVENTOR(S) : Anne Berthereau et al.

It is certified that error appears in the above-identified patent and that said Letters Patent is hereby corrected as shown below:

On the title page, Item (86), the Application Filing Date is incorrect. Item (86) should read:

-- (86) PCT No.:  PCT/FR2005/050161

§371 (c)(1),
(2), (4) Date:  Feb. 14, 2007 --

Signed and Sealed this
Eleventh Day of January, 2011

David J. Kappos
*Director of the United States Patent and Trademark Office*